(12) United States Patent
Ozuysal

(10) Patent No.: US 10,055,103 B1
(45) Date of Patent: Aug. 21, 2018

(54) TEXT ENTRY BASED ON PERSISTING ACTIONS

(71) Applicant: Google Inc., Mountain View, CA (US)

(72) Inventor: Yusuf Ozuysal, Mountain View, CA (US)

(73) Assignee: Google LLC, Mountain View, CA (US)

(*) Notice: Subject to any disclaimer, the term of this patent is extended or adjusted under 35 U.S.C. 154(b) by 266 days.

(21) Appl. No.: 14/059,360

(22) Filed: Oct. 21, 2013

(51) Int. Cl.
| | | |
|---|---|---|
| *G06F 3/00* | (2006.01) | |
| *G06F 3/048* | (2013.01) | |
| *G06F 7/00* | (2006.01) | |
| *G06F 17/30* | (2006.01) | |
| *G06F 3/0484* | (2013.01) | |
| *G06F 17/24* | (2006.01) | |
| *G06F 3/0488* | (2013.01) | |

(52) U.S. Cl.
CPC ...... *G06F 3/04842* (2013.01); *G06F 3/04886* (2013.01); *G06F 17/24* (2013.01)

(58) Field of Classification Search
CPC .... G06F 3/0237; G06F 3/0481; G06F 3/0482; G06F 17/243; G06F 17/276
USPC ....... 715/780, 771, 738, 224, 271, 744, 745; 707/706, 713, 751, 759, 767, 768
See application file for complete search history.

(56) References Cited

U.S. PATENT DOCUMENTS

| | | | | |
|---|---|---|---|---|
| 7,743,339 B1* | 6/2010 | Chanda | ................. | G06F 9/4443 715/261 |
| 8,237,682 B2* | 8/2012 | Stephanick | ........... | G06F 3/0236 178/18.01 |
| 8,386,958 B1* | 2/2013 | Zavitaev | ............... | G06F 3/0236 345/168 |
| 8,493,344 B2 | 7/2013 | Fleizach et al. | | |
| 2005/0169527 A1* | 8/2005 | Longe | .................. | G06F 3/0237 382/177 |
| 2008/0055117 A1* | 3/2008 | Lee | ........................ | G06F 3/0236 341/23 |
| 2008/0057926 A1* | 3/2008 | Forstall | ................. | G06F 3/0482 455/415 |
| 2008/0065617 A1* | 3/2008 | Burke | ............... | G06F 17/30864 |
| 2008/0168349 A1* | 7/2008 | Lamiraux | ............. | G06F 3/0482 715/702 |
| 2010/0131900 A1* | 5/2010 | Spetalnick | ............ | G06F 17/276 715/825 |

(Continued)

*Primary Examiner* — Shourjo Dasgupta

(74) *Attorney, Agent, or Firm* — McDermott Will & Emery LLP

(57) ABSTRACT

A system for entering text in an application that includes a memory and one or more processors configured to execute instructions stored in the memory to perform operations including receiving an input gesture within an input field with autocomplete of the application. The operations include determining, in response to the received input gesture, if the input field with autocomplete of the application contains characters. The operations include presenting an interface for cycling through one or more characters available for entry into the input field with autocomplete when the input field with autocomplete is determined to contain no characters. The operations also include cycling through the one or more characters within the input field with autocomplete for a duration of the input gesture. The operations further include selecting at least one of the cycled characters at an end of the duration of the input gesture.

28 Claims, 9 Drawing Sheets

(56) References Cited

U.S. PATENT DOCUMENTS

| | | | |
|---|---|---|---|
| 2011/0050628 A1* | 3/2011 | Homma | G06F 3/0236 345/174 |
| 2011/0066634 A1* | 3/2011 | Phillips | G10L 15/22 707/769 |
| 2011/0154263 A1* | 6/2011 | Roulliere | G06F 3/0482 715/830 |
| 2011/0307822 A1* | 12/2011 | Park | G06F 3/04883 715/773 |
| 2012/0242582 A1* | 9/2012 | Choi | G06F 3/0233 345/169 |
| 2013/0031110 A1 | 1/2013 | Bhola et al. | |
| 2013/0125037 A1 | 5/2013 | Pasquero et al. | |
| 2013/0191368 A1 | 7/2013 | Raichelgauz et al. | |
| 2013/0298071 A1* | 11/2013 | Wine | G06F 3/04883 715/780 |
| 2013/0332856 A1* | 12/2013 | Sanders | G06F 3/0481 715/753 |
| 2014/0035823 A1* | 2/2014 | Khoe | G06F 3/02 345/171 |
| 2014/0245177 A1* | 8/2014 | Maklouf | G06F 3/04886 715/752 |
| 2015/0261310 A1* | 9/2015 | Walmsley | G06F 1/1626 345/173 |
| 2016/0041965 A1* | 2/2016 | Ghassabian | G06F 3/005 715/261 |

\* cited by examiner

TEXT ENTRY BASED ON PERSISTING ACTIONS

FIELD

The subject technology relates to applications, and more particularly, but not exclusively, to text entry applications.

BACKGROUND

Applications (e.g., web browsers) that perform query searches based on a search query entry may be implemented with a dedicated input interface. Some web browsers, such as mobile browsers, provide a software keyboard on a display of a mobile device such that a user needs to type in a web address (e.g., url) in an address bar of the web browser using the software keyboard.

SUMMARY

The disclosed subject matter relates to a computer-implemented method of entering text in an application. The method includes receiving an input gesture within an input field with autocomplete of the application. The method includes determining, in response to the received input gesture, if the input field with autocomplete of the application contains characters. The method includes presenting an interface for cycling through one or more characters available for entry into the input field with autocomplete when the input field with autocomplete is determined to contain no characters. The method also includes cycling through the one or more characters within the input field with autocomplete for a duration of the input gesture. The method further includes selecting at least one of the cycled characters at an end of the duration of the input gesture.

The disclosed subject matter further relates to a system for entering text in an application, in which the system includes a memory and one or more processors configured to execute instructions stored in the memory to perform operations that include receiving an input gesture within an input field with autocomplete of the application; determining, in response to the received input gesture, if the input field with autocomplete of the application contains characters; presenting an interface for cycling through one or more characters available for entry into the input field with autocomplete when the input field with autocomplete is determined to contain no characters; cycling through the one or more characters within the input field with autocomplete for a duration of the input gesture; and selecting at least one of the cycled characters at an end of the duration of the input gesture.

The disclosed subject matter further relates to a non-transitory machine readable medium embodying instructions that, when executed by a machine, allow the machine to perform a method of entering text in an application. The method includes receiving an input gesture within an input field with autocomplete of the application. The method includes determining, in response to the received input gesture, if the input field with autocomplete of the application contains characters. The method includes presenting an interface for cycling through one or more characters available for entry into the input field with autocomplete when the input field with autocomplete is determined to contain no characters. The method also includes cycling through the one or more characters within the input field with autocomplete for a duration of the input gesture. The method further includes selecting at least one of the cycled characters at an end of the duration of the input gesture.

It is understood that other configurations of the subject disclosure will become readily apparent to those skilled in the art from the following detailed description, wherein various configurations of the subject disclosure are shown and described by way of illustration. As will be realized, the subject disclosure is capable of other and different configurations and its several details are capable of modification in various other respects, all without departing from the scope of the subject disclosure. Accordingly, the drawings and detailed description are to be regarded as illustrative in nature and not as restrictive.

BRIEF DESCRIPTION OF THE DRAWINGS

Certain features of the subject disclosure are set forth in the appended claims. However, for purpose of explanation, several implementations of the subject disclosure are set forth in the following figures.

DETAILED DESCRIPTION

The detailed description set forth below is intended as a description of various configurations of the subject disclosure and is not intended to represent the only configurations in which the subject disclosure is practiced. The appended drawings are incorporated herein and constitute a part of the detailed description. The detailed description includes specific details for the purpose of providing a thorough understanding of the subject disclosure. However, it will be clear and apparent to those skilled in the art that the subject disclosure is not limited to the specific details set forth herein and is practiced without these specific details. In some instances, well-known structures and components are shown in block diagram form in order to avoid obscuring the concepts of the subject disclosure.

Figure 1:
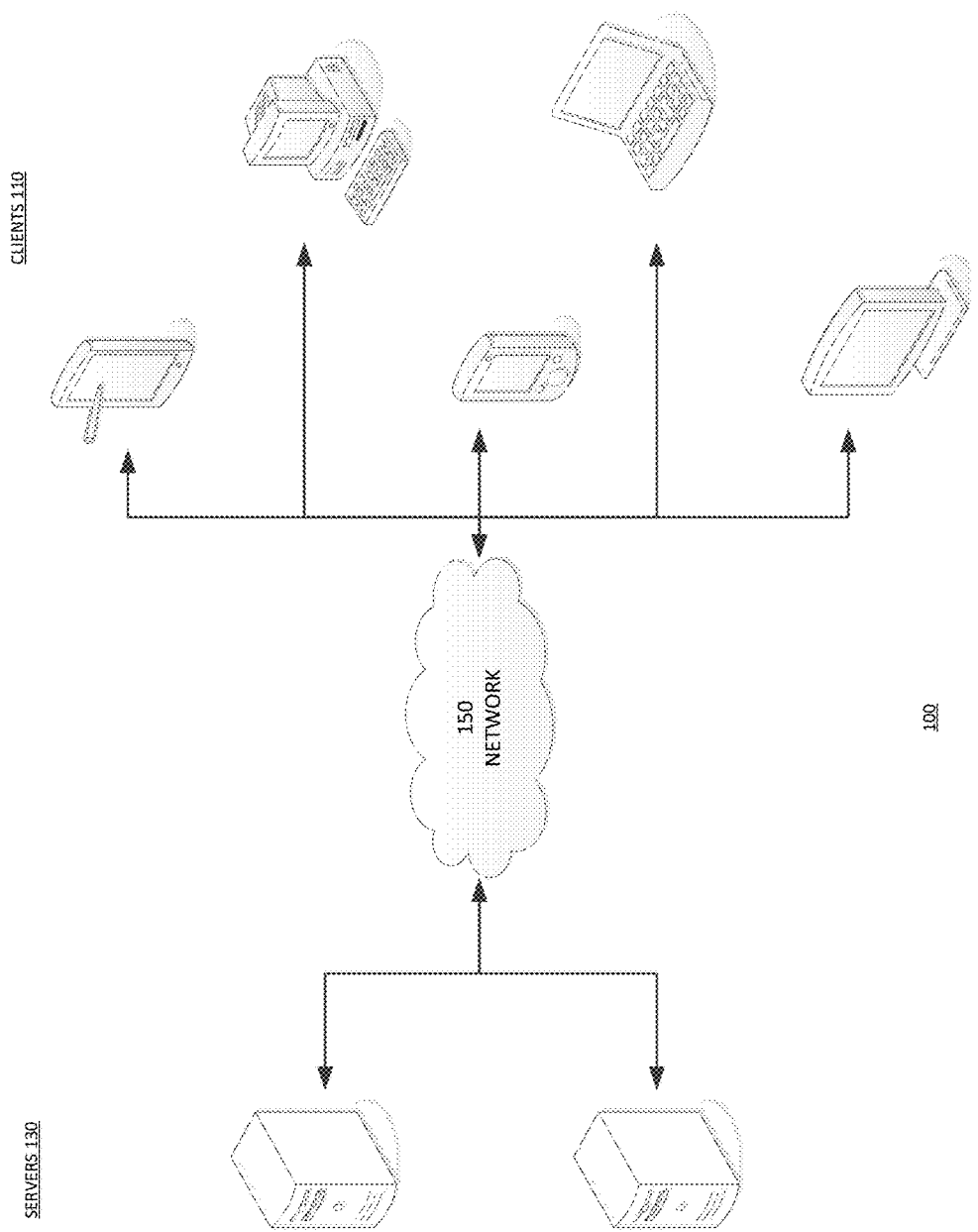
FIG. 1 is a diagram illustrating an example of an architecture for text entry based on persisting actions according to one or more implementations of the subject technology.

FIG. 1 illustrates an example architecture for text entry based on persisting actions according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The architecture 100 includes servers 130 and clients 110 connected over a network 150. Each client 110 is configured to execute an application for viewing a document that includes an input field with autocomplete such as a search input field. The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The application can be, for example, a web browser or search application, and the document can be, for example, a web page for an online search engine. When a user enters input into the search input field, whether a partial or complete input (e.g., a partial or complete word or web page address), the application displays search suggestions for the user based on the entered (but not yet submitted) input. The search suggestions may be, for example, queries (e.g., search terms or phrases) or web page addresses (e.g., Uniform Resource Locators or "URLs").

The search suggestions may be provided from various sources, including the user's search history (e.g., stored in local user history on the client), search results based on what the user has typed so far (e.g., stored in local user history on the client), or search suggestions from the history of other users based on what the user has typed so far (e.g., stored in global user history on a server 130). At least some of the search suggestions, such as search suggestions from the history of other users, may be provided over a network 150 from global user history stored on one or many of the servers 130. For purposes of load balancing, multiple servers 130 can host the global user history, either separately (e.g., as replicated copies) or in part.

The servers 130 can be any device having an appropriate processor, memory, and communications capability for the global user history. The network 150 can include, for example, any one or more of a personal area network (PAN), a local area network (LAN), a campus area network (CAN), a metropolitan area network (MAN), a wide area network (WAN), a broadband network (BBN), or the Internet. Further, the network 150 can include, but is not limited to, any one or more of the following network topologies, including a bus network, a star network, a ring network, a mesh network, a star-bus network, tree or hierarchical network.

Each search suggestion may be provided for display in the application on the client in a listing of entries for search suggestions. The application is configured to receive a touch input, such as a side swipe gesture or a long press gesture, for an entry in the listing of entries for search suggestions. Upon receiving the touch input, the application is configured to remove the entry from the listing of entries for search suggestions. In certain aspects, the application may ask for confirmation to remove the entry prior to removing the entry from the listing of entries for search suggestions.

Figure 2:
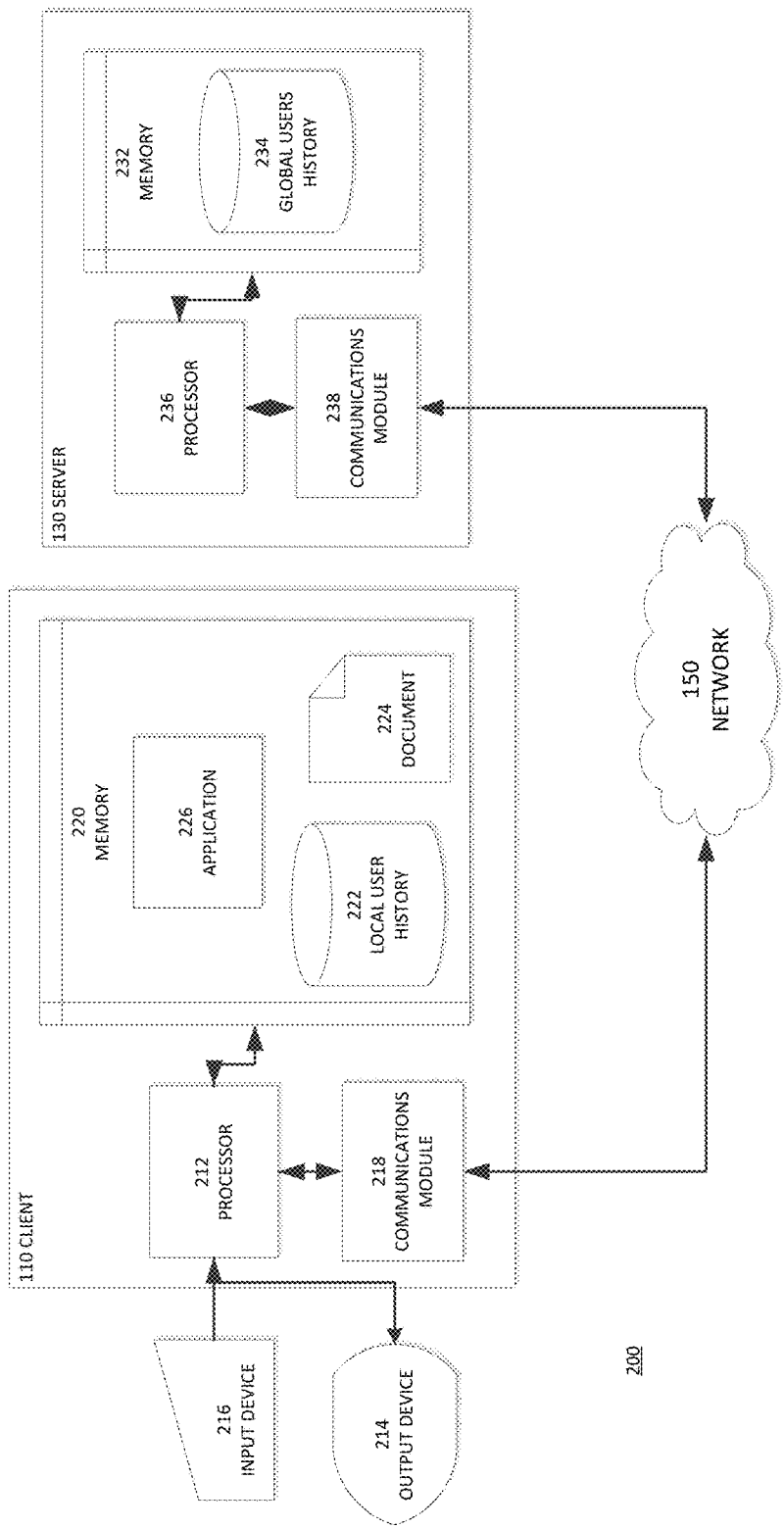
FIG. 2 is a block diagram illustrating an example client and server from the architecture of FIG. 1 according to one or more implementations of the subject technology.

FIG. 2 is a block diagram illustrating an example client and server from the architecture of FIG. 1 according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220 that includes an application 226 for viewing a document 224 that includes an input field with autocomplete such as a search input field. The memory 220 also includes a user of the client's past history for the search input field that is stored as local user history 222. The local user history 222 can reference and otherwise download data over the network 150 from a global users history 234 stored in the memory 232 of a server 130 by the processor 236 of the server 130 sending the data from the communications module 238 of the server 130 to the communications module 218 of the client 110. The application 226 can be, for example, a web browser, a database viewer, a mobile app, or any other application 226 that can be configured for use with a search input field. The document 224 can be, for example, a web page, a database, content for a mobile app, or any other document 224 configured for display in the application 226. The application 226 includes a search input field. The search input field can be, for example, an omnibox configured to receive a query of either an address for a web page to load or a search phrase to be searched using a search provider. The client 110 also includes an input device 216 for receiving input for the search input field, such as a touch input device (e.g., touchscreen), keyboard, or mouse, and an output device 214, such as a display (e.g., touchscreen display).

The processor 212 of the client 110 is configured to execute instructions, such as instructions physically coded into the processor 212, instructions received from software in memory 240, or a combination of both, for modifying a list of suggested queries using a touch input. For example, the processor 212 of the client 110 is configured to receive, in an input field (e.g., of the application), a query from a user, and provide, for display, at least one suggestion responsive to the received query.

The suggestion(s) can be provided to the application 226 from the local user history 222 in the memory 220 of the client 110 and/or from the global users history 234 (e.g., search suggestions from the history of other users based on what the user has typed so far) in the memory 232 of the server 130. The suggestion(s) can be provided in response to the user, for example, typing the query in the input field but prior to the user submitting the query for searching (e.g., by selecting a "submit" or "search" button). The suggestion(s) can be, for instance, an address (e.g., URL), search phrase, action (e.g., call a restaurant, display directions to a business), answer (e.g., to a calculation), or status (e.g., of a package or flight). The suggestion(s) can be provided for display (e.g., in the application 226) in a listing for suggestion entries that is, for example, displayed below the input field.

The processor 212 is also configured to receive a touch input indicative of a request to delete at least one suggestion. The touch input can be, for example, a horizontal swiping motion. The touch input can also be, for instance, a double tap, single tap, tap and hold, tap-hold and drag, pinch, or any other touch gesture configured to indicate a request to delete a suggestion. The processor 212 is further configured to remove, from display (e.g., on the output device 214), the suggestion in response to the touch input.

In certain aspects, instead of removing the suggestion directly in response to the touch input, the processor 212 is configured to provide, for display, a request to receive confirmation of the request to delete the suggestion prior to receiving the other touch input indicative of the confirmation. For example, upon receipt of the touch input indicative of the request to delete the suggestion, the processor 212 can be configured to display a visual indicator (e.g., "Confirm Deletion?") asking the user to confirm whether the user would like to delete the suggestion from display. In instances where the suggestion is provided for display as an entry in a list of suggestions, the request to receive confirmation can be provided for display within the entry in the list for the suggestion to be removed. In certain aspects, the processor 212 may then receive another touch input (e.g., from the user) indicative of a confirmation of the request to delete the at least one suggestion, and the suggestion may then be removed from the display based on the other touch input indicative of the confirmation. For example, in response to the indicator "Confirm Deletion", the user may select a "Yes" button to have a suggestion removed from the display.

If the user is holding the mobile device such as the client 110 with one hand and the search input field such as an address bar is spaced sufficiently enough from a text entry interface such as a software keyboard on the display (e.g., the output device 214) to make handling of the mobile device with one hand impractical, the user may need to shift the handling of the mobile device on the same hand or require using both hands depending on the size of the display. In cases where the web browser (e.g., application 226) autocompletes a touch input such as an address bar entry after two or three characters having been entered by the user, the shift in how the mobile device is handled by the user becomes an unnecessary burden.

In addition, a long press gesture is not mapped to any action when there is no text present in the search input field. If there is any text, long press gestures can select the entire text in the search input field. Typing by cycling through characters may be often unwieldy and more burdensome than using the software keyboard. However, since entry of a few characters can initiate an autocomplete feature, there may be a special situation where the "slowness" of cycling through each character can be more tolerable than changing the way a user holds a mobile device.

In some aspects, the subject disclosure provides a process that can cue to the search input field and provide an interface for cycling through characters when the user provides a long press gesture on the display. The interface as an overlaid input box may be superimposed over the search input field such as an address bar. As the user persists the long press gesture, by holding his or her finger on the display (e.g., on the output device 214), the first character location of the search query entry cycles through the available characters in an active software keyboard (e.g., keyboard display on the output device 214). In some aspects, the software keyboard is not displayed in response to the long press gesture. Alternatively, the software keyboard may be displayed in response to the long press gesture.

When the user lifts his or her finger from the display, the character that appears beneath the user's finger when the finger is lifted from the display is committed as the first character of the search query entry. This process can be repeated to select multiple characters of the search query entry or until an autocomplete feature of the web browser can be initiated. In some aspects, selection of one character may initiate the autocomplete feature. In this regard, the selected character may be commonly used as a search query entry. In some aspects, two or more characters are needed to initiate the autocomplete feature to suggest the predicted term (e.g., url) needed to perform the search query. In some aspects, a subsequent (or additional) long press gesture may continue (or resume) the cycling of the characters.

The aforementioned process may be performed when a user is providing a touch selection, for example, while holding the mobile device in one hand without the need to alter the manner of handling the mobile device. In some aspects, instead of a long press gesture, a separate action can be used to trigger the character cycling. In some aspects, an additional gesture can be added to change the speed with which the characters are cycled. For example, scrolling to the left without lifting the finger such as a horizontal swiping motion may slow the cycling speed. In some aspects, scrolling to the right without lifting the finger may speed up the cycling speed.

In addition, the interface may be enhanced such that instead of a single letter shown to represent the character cycling, a series of moving characters may be displayed on the search input field. In this regard, the series of moving characters may be scrolled horizontally along an axis of the search input field such that the display of a single character appears to change beneath the user's thumb. When the user lifts his or her thumb, the user can select one of the moving characters as the first letter or character of the search query entry. In this regard, the character that is displayed beneath the thumb's location on the display at the moment the finger is lifted is selected.

Although many examples provided herein describe a user's information (e.g., search history) being stored in memory, each user must grant explicit permission for such user information to be stored. The explicit permission may be granted using privacy controls integrated into the disclosed system. If requested user information includes demographic information, then the demographic information is aggregated on a group basis and not by individual user. Each user is provided notice that such user information will be stored with such explicit consent, and each user may at any time end having the user information stored, and may delete the stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Figure 3:
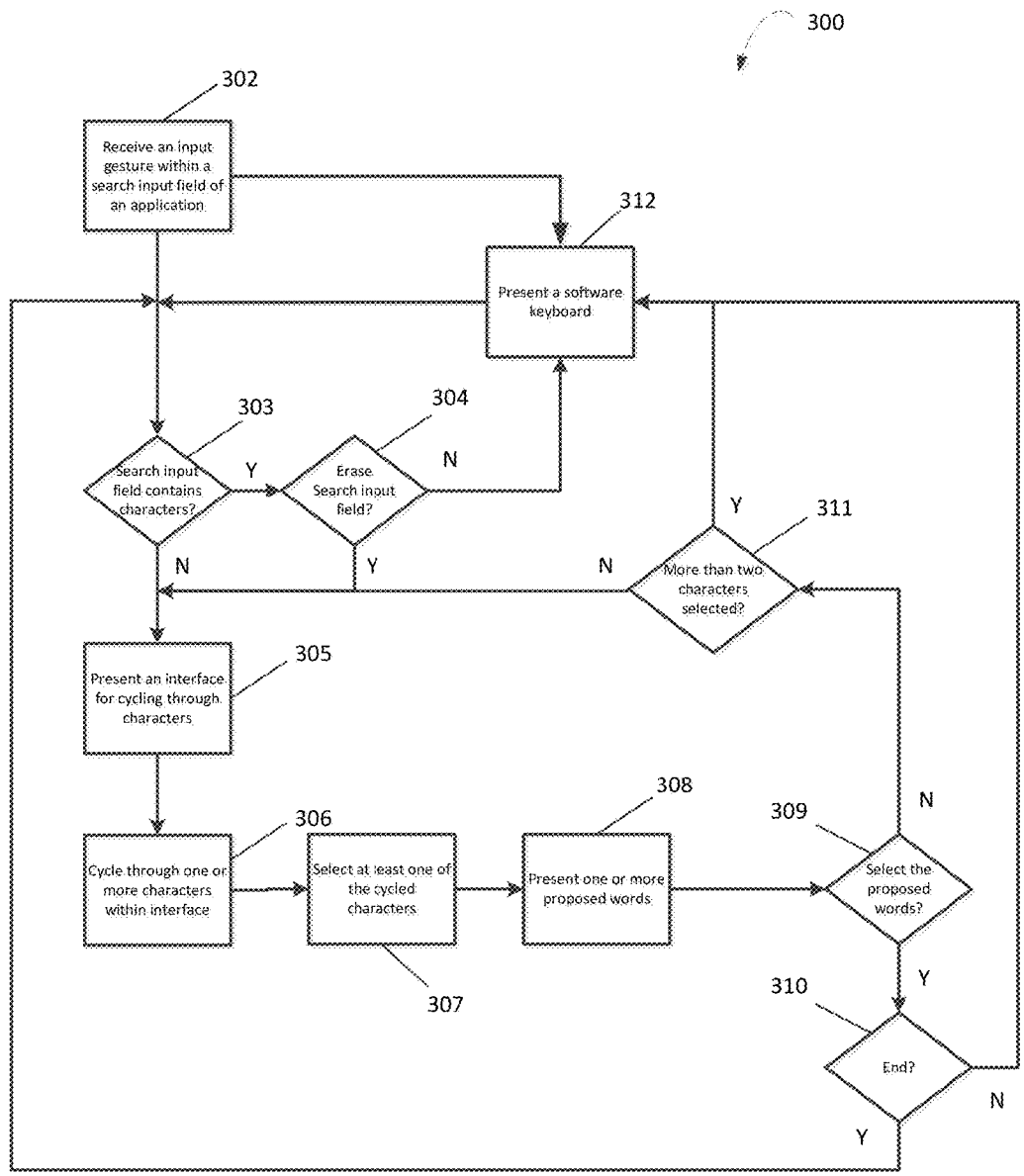
FIG. 3 illustrates an example process for text entry based on persisting actions using an example client of FIG. 2 according to one or more implementations of the subject technology.

FIG. 3 illustrates an example method 300 for text entry based on persisting actions using an example client of FIG. 2 according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

Client 110 of FIG. 1, for example, may be used to implement method 300. However, method 300 may also be implemented by systems having other configurations. Although method 300 is described herein with reference to the examples of FIGS. 2 and 4A-4E, method 300 is not limited to these examples. Furthermore, although method 300 is illustrated in the order shown in FIG. 3, it is understood that method 300 may be implemented in a different order.

At process 302, the processor 212 receives an input gesture within an input field with autocomplete such as a search input field of an application (e.g., web browser or search application). In some aspects, the input gesture is received via a touchscreen display (e.g., via output device 214 of FIG. 2). The input gesture may be a long press gesture, a sliding motion gesture, a swiping motion gesture or a double tap gesture. In this respect, the processor 212 may be configured to detect one of the aforementioned gestures as the input gesture via user preference settings of the application of the client 110. In some aspects, the user preference settings are stored in a local memory of the client 110 (e.g., the memory 220). In other aspects, the user preference settings are stored on a network memory (e.g., the memory 230 of server 130).

The input gesture may be indicative of a request to search for a web address or a web terms. In response to the request, search suggestions may be provided by the application from various sources, including the user's search history (e.g., stored in local user history on the client 110), search results based on what the user has typed so far (e.g., stored in local user history on the client 110), or search suggestions from the history of other users based on what the user has typed so far (e.g., stored in global user history on the server 130).

In certain aspects, a software keyboard may be presented (e.g., displayed on the output device 214) in response to the received input gesture (312). In this respect, the software keyboard may remain displayed for a duration of the input gesture (e.g., during the long press gesture).

The processor 212 may be configured to enter an empty state, a first cycling state, a second cycling state or a keyboard state depending on implementation. In some aspects, the empty state represents a state of the application when the search input field contains no characters and a cycling operation is inactive. In certain aspects, the first cycling state represents the state of the application when the cycling operation is active for a first time. In some aspects, the second cycling state represents the state of the application when the cycling operation is active for a second time. In certain aspects, the keyboard state represents the state of the application when the software keyboard is active.

At process 303, the processor 212 determines, in response to the received input gesture, that the search input field of the application contains no characters. In certain aspects, the processor 212 of client 110 enters the empty state if the search input field is determined to contain no characters. If the processor 212 determines that the search input field contains characters, the processor 212 may determine whether the search input field should be erased (304). In this respect, the processor 212 may be configured to display a visual indicator asking the user to confirm whether the user would like to erase (or delete) the search input field. If the search input field is erased (or characters therein are deleted), then the processor 212 may proceed to process 305. If the user elects not to erase the search input field because the terms (or characters) displayed therein are part of a desired search term, for example, then the processor 212 may be configured to display the software keyboard (312) to further facilitate the search term query.

At process 305, the processor 212 presents, in response to the determination, an interface for cycling through one or more characters available for entry into the search input field (sometimes referred to as a cycling interface). The processor 212 may be configured to display an overlay box superimposed over the search input field such that the displayed characters are provided for display within the overlay box. In this respect, the cycling operation is displayed within the overlay box.

In certain aspects, the search input field is provided for display along a horizontal direction. In this regard, the process for presenting the interface for cycling through one or more characters may include a process for displaying the one or more characters as a series of moving characters along the horizontal direction. The process also may include displaying the one or more characters as a series of moving characters along a continuous circular direction spatially proximate to the search input field. In some aspects, the cycling operation may be presented on the software keyboard as a cycling interface such that the processor 212 cycles through the characters of the software keyboard in response to the input gesture received at the search input field.

At process 306, the processor 212 cycles through the one or more characters within the search input field for a duration of the input gesture. In cycling through the one or more characters, the process 306 may include a process for transitioning from the empty state to a first cycling state representing the cycle for the first character in the search term. In the first cycling state, the processor 212 may shift the one or more characters horizontally within the overlay box during the duration of the input gesture.

Performing the first autocomplete operation may include a process for providing a first proposed word based on a search history. The search history may be retrieved from a memory (e.g., memory 220 of FIG. 2). In turn, the processor 212 may search the search history for proposed words associated with the first character and determine the first proposed word based on a search characteristic associated with the first character. In certain aspects, selecting the first character includes a process for detecting removal of the input gesture from the location within the search input field.

At process 307, the processor 212 selects at least one of the cycled characters at an end of the duration of the input gesture. The processor 212 may select a first character of a search term among the shifted characters upon detecting a release of the input gesture (e.g., removal of user touch from the output device 214). In some aspects, the selected character is located directly beneath a user's touch (e.g., user's thumb) when the touch release is detected. In other aspects, the selected character is located outside of the user's touch when the touch release is detected.

At process 308, the processor 212 presents, responsive to selecting the at least one of the cycled characters, one or more proposed words, having at least one of the selected cycled characters, within the search input field. For example, the processor 212 may perform an autocomplete operation based on the first selected character. In certain aspects, the process 308 may include a process for performing an autocomplete operation after each selection of the cycled characters. The autocomplete operation may include providing search suggestions based on a local search history and/or a global search history.

At process 309, the processor 212 may be configured to determine whether to select one of the proposed words in a first instance of the autocomplete operation. If the proposed word from the first instance is determined not to be selected, the processor 212 may transition from the first cycling state to a second cycling state representing the cycle for the second character in the search term (311). In turn, the processor 212 may present the cycling interface for the second cycling state.

In some aspects, the processor 212 is configured to determine whether to select one of the proposed words in a second instance of the autocomplete operation. If the proposed word from the second instance is determined to be selected, the processor 212 may transition from the second cycling state to a keyboard state when the processor 212 determines that the search term inquiry should end (310).

If the proposed word from either the first or second autocomplete operation instances is selected, then the processor 212 may be configured to display a visual indicator requesting the user to confirm whether the search term inquiry should end (310). If the user elects not to end the search term inquiry, then the processor 212 may be configured to display the software keyboard (if not already displayed) at process 312 and enable further searching through the software keyboard (with the cycle interface disabled).

At process 311, the processor 212 may be configured to determine whether more than two characters have been selected via the cycling operation. If more than two characters are determined to have been selected, then the processor 212 may be configured to present the software keyboard for further search related operations (with the cycle interface disabled). If no characters or only one character are determined to have been selected through the cycling operation, then the processor 212 may be configured to present the cycle interface (if not already displayed) and enable the cycling operation for cycling through the characters to determine the search term after the second selected character with the autocomplete operation, for example.

The processor 212 may be configured to receive a second input gesture within the search input field. The second input gesture may be received later in time from the first input gesture as a continuing operation to determine the search term. The processor 212 may shift the one or more characters during the duration of the second input gesture. In turn, the processor 212 may select a second character of the search term among the shifted characters and perform a second autocomplete operation based on the first and second selected characters.

In some aspects, the cycling operation is altered to satisfy a user's preference. For example, the processor 212 may be configured to increase a shifting speed (e.g., the rate at which the display of a character at a specific location in the search input field changes) of the cycling operation in response to receiving the sliding motion gesture in a first direction. Alternatively, the processor 212 may be configured to decrease the shifting speed of the cycling operation in response to receiving the sliding motion gesture in a second direction (e.g., opposite of the first direction).

The method 300 may include a process 312 for providing for display (e.g., on the output device 214), simultaneously with the cycling of the one or more characters, the software keyboard in response to the input gesture. In this respect, the processor 212 may be configured to receive a keyboard input from the software keyboard. The processor 212 may be configured to transition across multiple operation states while handling the character cycling such as transitioning from the empty state to a keyboard state in response to the keyboard input when a cursor is located in the search input field having no characters, transitioning from the first cycling state to the keyboard state in response to the keyboard input when the cursor is located directly after the first character in the search input field, and transitioning from the second cycling state to the keyboard state in response to the keyboard input when the cursor is located directly after the second character in the search input field.

FIGS. 4A-4E are example illustrations associated with the example process of FIG. 3 according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

Figure 4A:
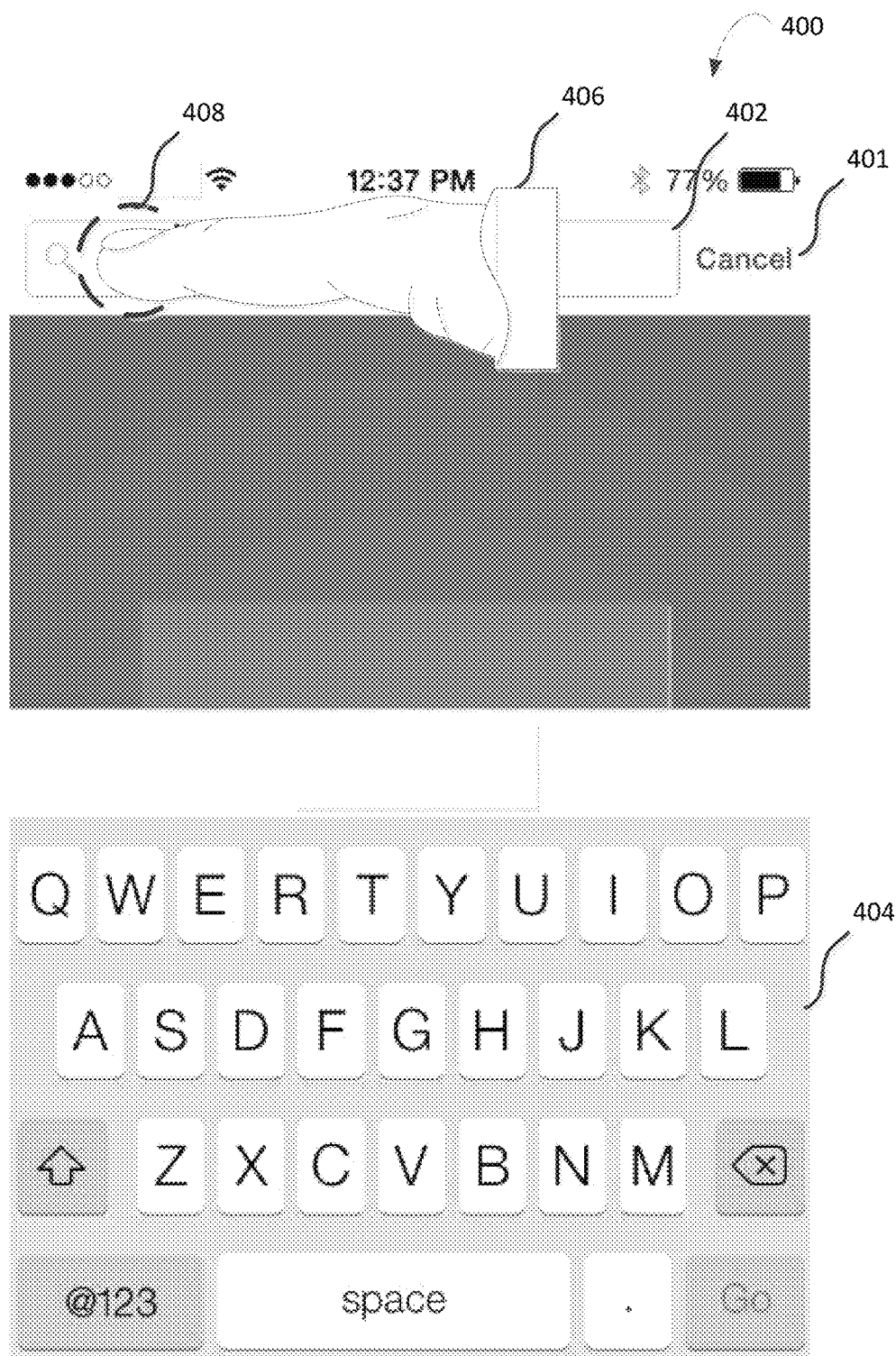
FIGS. 4A-4E are example illustrations associated with the example process of FIG. 3 according to one or more implementations of the subject technology.

Referring to FIG. 4A, a display 400 includes a document 401 (e.g., web portal) of an application (e.g., web browser), a search input field 402, and a software keyboard 404. In some aspects, the display 400 receives a user input 406 such as a long press gesture 408 to activate a cycling operation as a method of text entry with an autocomplete operation for determining a search term. The cycling operation may be activated in response to other types of gestures including, but not limited to, a double tap gesture, a swiping motion gesture and a sliding motion gesture.

As shown in FIG. 4A, the software keyboard 404 is presented in response to the user input 406. In this respect, the software keyboard 404 may receive one or more keyboard inputs when more than two characters, for example, have been selected via the cycling operation. The autocomplete operation may be enabled in response to each selected character of the cycling operation and/or in response to the one or more keyboard inputs. In certain aspects, the software keyboard 404 is not displayed (or presented) while the cycling operation is active (e.g., for the duration of the long press gesture 408).

Figure 4B:
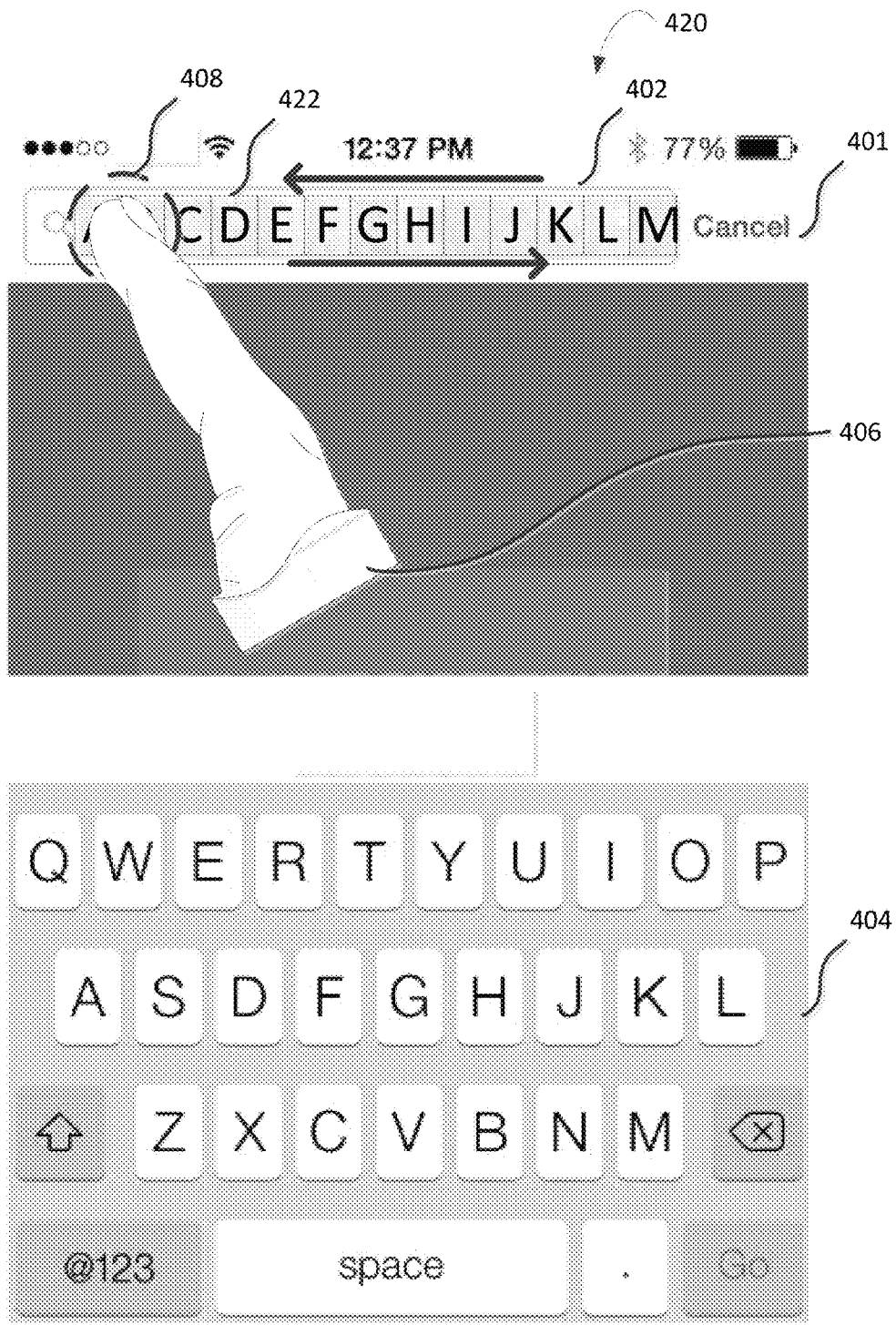

Referring to FIG. 4B, a display 420 includes a document 401 (e.g., web portal) of an application (e.g., web browser), a search input field 402, a software keyboard 404 and a cycle interface 422. Because display 420 is substantially similar to display 400 of FIG. 4A, only differences will be discussed with respect to FIG. 4B.

Upon receipt of the user input 406, a processor or receiving module, such as the processor 212, may be configured to detect and/or monitor the long press gesture 408 of the user input 406. In turn, the processor 212 may be configured to display the cycle interface 422 as an overlay box that is superimposed over the search input field 402. The overlay box may be transparent when displayed such that features of the search input field 402 are visible through the overlay box. In some aspects, the cycle interface 422 includes a series of moving characters that shift leftward or rightward, depending on implementation, for a duration of the long press gesture 408.

Rather than having a user enter the first and second characters of a search term via the software keyboard 404 before enabling an autocomplete operation, the user input 406 activates the cycling operation as a method of text entry. In this respect, the user can enter text by touching a location within the search input field via user input 406 and providing a specified gesture, such as the long press gesture 408, to control the operation of the cycling operation. The cycling operation reduces the need to change handling of a mobile device running the application since the same user input received within the search input field displays the cycle interface 422 (e.g., overlay box superimposed over the search input field 402) that can perform the search term query by cycling through characters, select one or two characters that suggest the search term and enable the auto-completion of the search term.

Figure 4C:
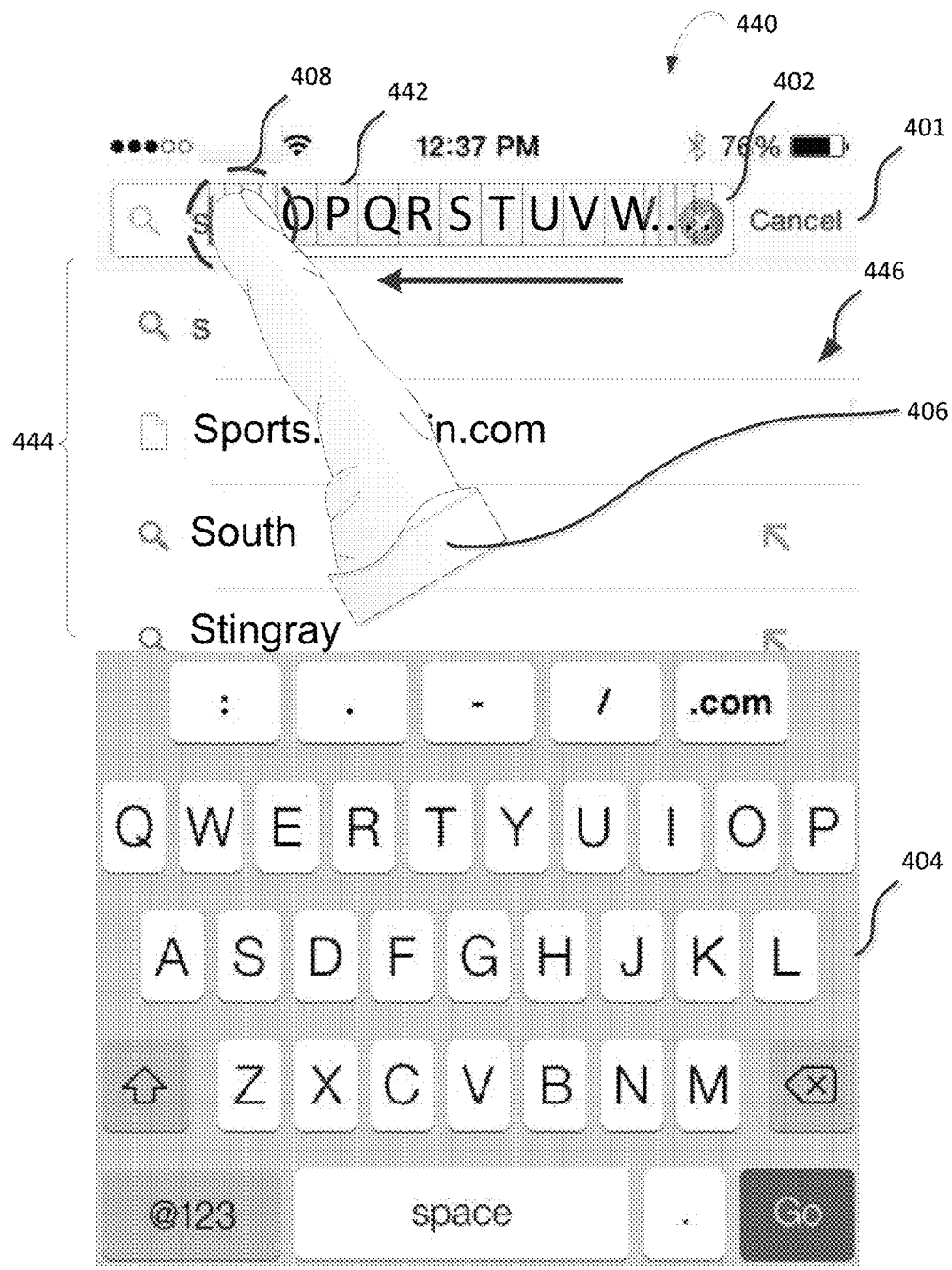

Referring to FIG. 4C, a display 440 includes a document 401 (e.g., web portal) of an application (e.g., web browser), a search input field 402, a software keyboard 404 and a cycle interface 422. Because display 440 is substantially similar to display 420 of FIG. 4B, only differences will be discussed with respect to FIG. 4C.

In certain aspects, the user input 406 initiates the cycling operation based on the long press gesture 408. For the duration of the long press gesture 408, the cycle interface 422 shows shifting of the moving characters in a leftward direction for cycling through the characters. The user input 406 may be intermittently removed from the touchscreen display (e.g., the output device 214) to switch between selection of the shifted characters. By way of example, the user input 406 can be removed from the display to select a desired character when the desired character is displayed beneath the user's finger. In this respect, each instance of when the user input 406 is removed from the display during the cycling operation can trigger a change of state (e.g., transition from the first cycling state to the second cycling state, transition from the second cycling state to the keyboard state).

As shown in FIG. 4C, the user input 406 is intermittently removed from the display when the character "s" reached the specified location (e.g., beneath the user's finger location) within the cycle interface 422. As such, the character "s" is selected when the user input 406 is removed, and the cycling operation transitions from the first cycling state to the second cycling state when the user input 406 is received within the user input field 402 thereafter to continue the cycling operation. The location of where the desired character may be selected may be set via the user preference settings of the application. For example, the user may select the desired character when the shifted character reaches the user's finger location on the display or when the shifted character reaches a specified location within the cycle interface 422.

When a shifted character is selected (e.g., the character "s"), an autocomplete interface 444 may be displayed as part of the web browser interface. The autocomplete interface 444 is configured to provided one or more suggested terms (sometimes referred to as proposed words) or web addresses based on the user's local search history or a global search history retrieved from one or more servers on a network (e.g., the network 150). The proposed words 446 may be based on the first selected character such that "sports.domain.com," "south" and/or "stingray," which all begin with the letter "s" for example, are possible terms that satisfy the search term query. The user may have the option to select one of the proposed terms 446 after selecting the first character from the cycling operation, and complete the search term query.

Figure 4D:
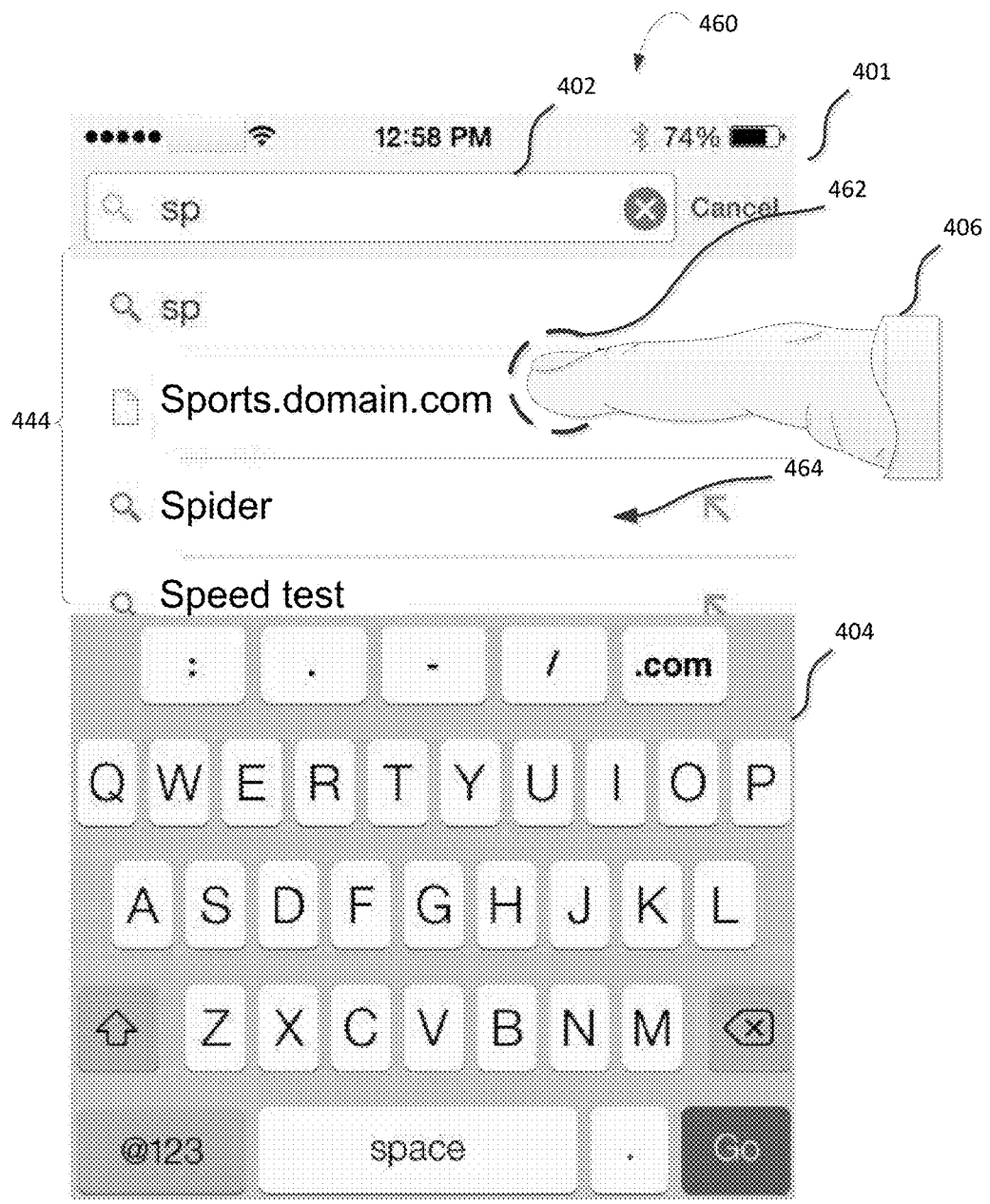

Referring to FIG. 4D, a display 460 includes a document 401 (e.g., web portal) of an application (e.g., web browser), a search input field 402, and a software keyboard 404. Because display 460 is substantially similar to display 440 of FIG. 4C, only differences will be discussed with respect to FIG. 4D.

As shown in FIG. 4D, the user input 406 is intermittently removed from the display when the shifted character "p" reached the specified location (e.g., beneath the user's finger location) within the cycle interface 422. As such, the character "p" is selected when the user input 406 is removed, and the cycling operation can transition from the second cycling state to the keyboard state to activate the software keyboard 404. In some aspects, the cycling operation is disabled after the second character is selected to enable use of the keyboard and/or the autocomplete operation. The cycling operation may be set to continue operating even after the second selected character up to a defined number of selected characters via the user preference settings of the application.

In response to the second selected character, the autocomplete interface 444 may be configured to provide one or more proposed words 464 based on the second selected character such that "sports.domain.com," "spider" and/or "speed test," which all begin with the letters "sp" for example, are possible terms that satisfy the search term query. The user may have the option to select one of the proposed terms 446 after selecting the second character from the cycling operation, and complete the search term query. As shown in FIG. 4D, a request is received via the user input 406 to select the web address "sports.domain.com" from the autocomplete interface 444. In the event the proposed words 464 do not include the desired search term, the user may utilize the software keyboard 404 to enter additional characters via the search input field 402 to determine the desired search term. In some aspects, the cycle interface 422 (not shown) is configured to remain enabled after the second selected character to determine the additional characters needed to complete the desired search term.

Figure 4E:
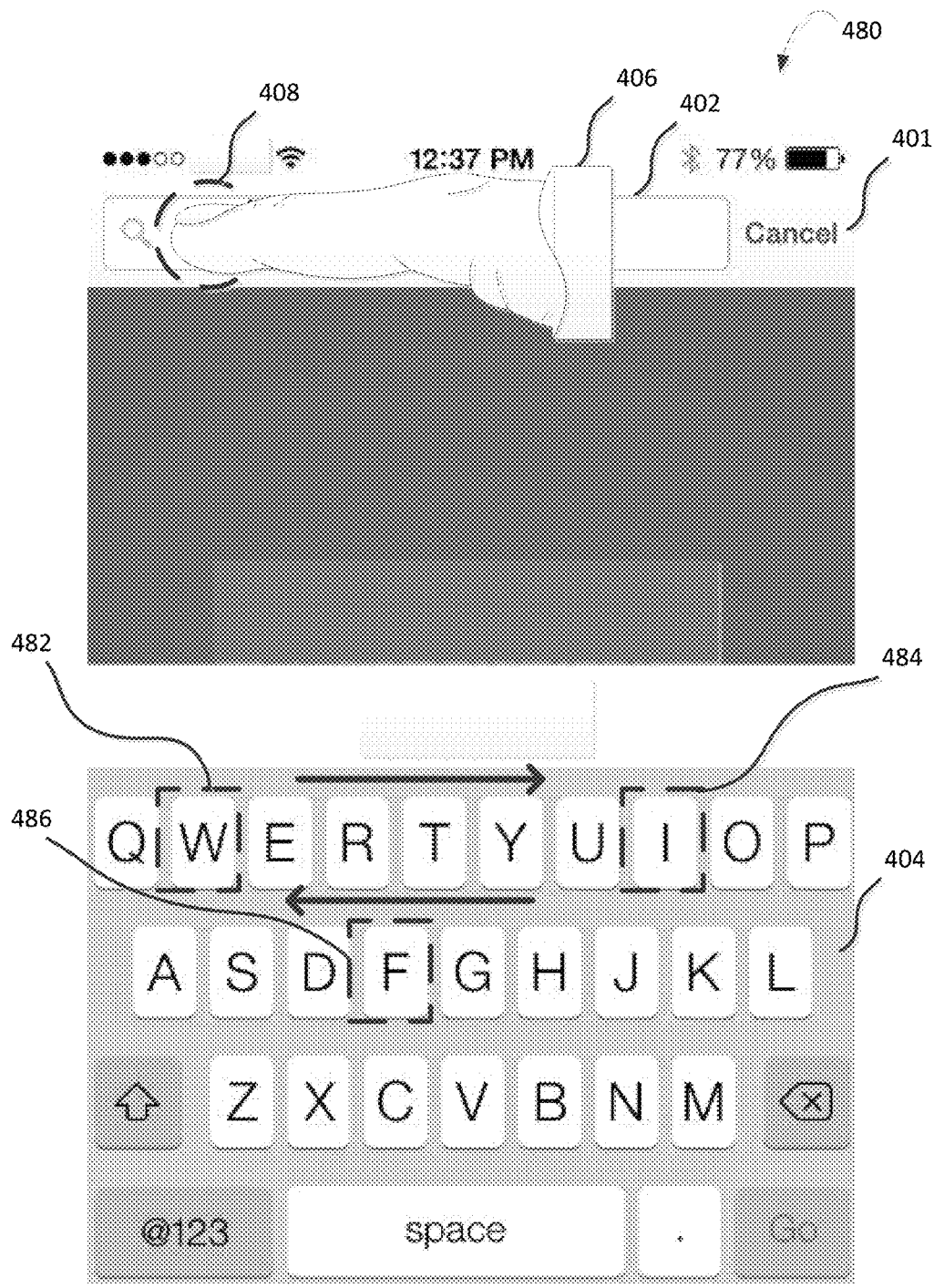

Referring to FIG. 4E, a display 480 includes a document 401 (e.g., web portal) of an application (e.g., web browser), a search input field 402, and a software keyboard 404. Because display 480 is substantially similar to display 400 of FIG. 4A, only differences will be discussed with respect to FIG. 4E.

In some aspects, the display 480 receives the user input 406 such as the long press gesture 408 to activate a cycling operation as a method of text entry with an autocomplete operation for determining a search term. The cycling operation may be activated in response to other types of gestures including, but not limited to, a double tap gesture, a swiping motion gesture and a sliding motion gesture.

As shown in FIG. 4E, the software keyboard 404 is presented in response to the user input 406. Rather than providing the cycle interface 422 (not shown) as an overlay box superimposed over the search input field 402, the software keyboard 404 may facilitate the cycling operation by displaying visual indicators over the characters displayed within the software keyboard 404 to represent the cycling through of characters.

For example, the cycling operation begins in response to the user input 406, and a visual indicator is presented for the duration of the long press gesture 408 to represent the character cycling process. The visual indicator is displayed over location 482 (e.g., character "W") at time t0, and shifts through the characters along that row in a right-ward direction. The visual indicator is then displayed over location 484 (e.g., character "I") at time t1, and may continue shifting through additional rows of the software keyboard 404 so long as the long press gesture 408 persists on the display. The visual indicator is then displayed over location 486 (e.g., character "F") at time t2 to represent the progression of the cycling operation. The visual indicator may shift in an opposite direction from the previous row or may continue shifting in the same direction as the previous row.

Figure 5:
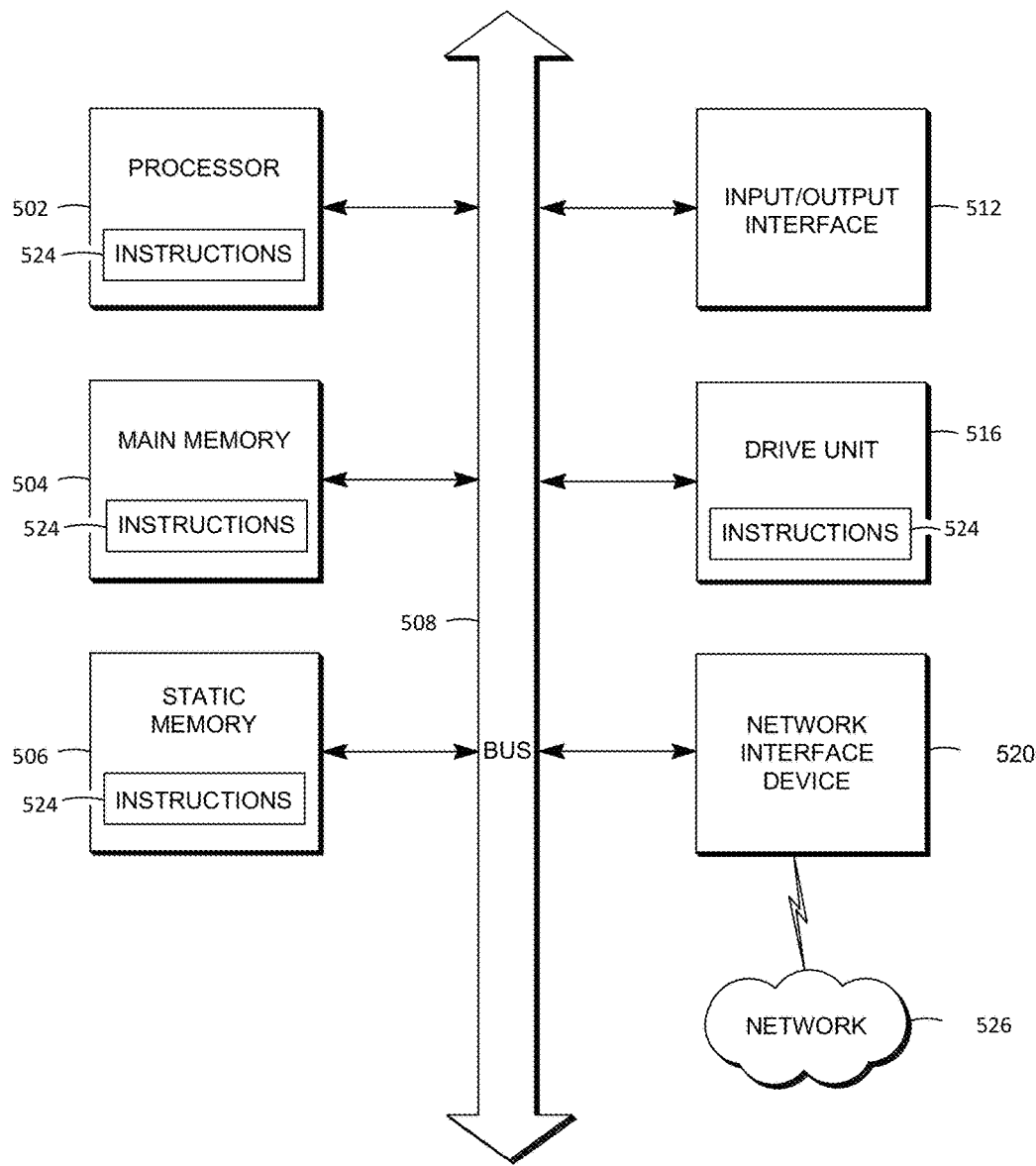
FIG. 5 is a block diagram illustrating an example computer system with which the clients and server of FIG. 2 can be implemented.

FIG. 5 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218 and 238) include networking interface cards, such as Ethernet cards and modems. In certain aspects, the input/output module 510 is configured to connect to multiple devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode) or LCD (liquid crystal display) screen, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

In some aspects, the client 110 may be a system for entering text in an application running on the client 110. The client 110 includes a memory such as memory 504 and one or more processors such as processor 502 configured to execute instructions stored in the memory 504 to perform operations including receiving an input gesture within an search input field of the application; determining, in response to the received input gesture, that the search input field of the application contains no characters; presenting, in response to the determination, an interface for cycling through one or more characters available for entry into the search input field; cycling through the one or more characters within the search input field for a duration of the input gesture; and selecting at least one of the cycled characters at an end of the duration of the input gesture.

In certain aspects, the client 110 includes a non-transitory machine readable medium such as memory 504 embodying instructions that, when executed by a machine such as processor 502, allow the machine to perform a method of entering text in an application running on the client 110, where the method includes receiving an input gesture within an search input field of the application; determining, in response to the received input gesture, that the search input field of the application contains no characters; presenting, in response to the determination, an interface for cycling through one or more characters available for entry into the search input field; cycling through the one or more characters within the search input field for a duration of the input gesture; and selecting at least one of the cycled characters at an end of the duration of the input gesture.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method of entering text in an application, the method comprising:
   receiving a first input gesture at a location in an input field with autocomplete of the application;
   presenting, in response to the first input gesture in the input field, a cycling interface for cycling through characters available for entry into the input field, wherein presenting the cycling interface further comprises providing an overlay box superimposed over the input field, the input field comprising a search field of a web browser, and the one or more of the characters for cycling being provided for display within the overlay box;
   cycling through the characters for a duration of the first input gesture in the input field, wherein, for the duration of the first input gesture, the cycling interface provides for display shifting of the characters in a particular direction;
   selecting a character from the cycled characters at an end of the duration of the first input gesture in the input field, the duration of the first input gesture indicating which of the cycled characters to select for entry into the input field; and
   providing the selected cycled character for display within the input field, the location of the first input gesture in the input field indicating where to locate the selected cycled character for display.

2. The method of claim 1, further comprising:
   presenting, responsive to selecting the at least one of the cycled characters, one or more proposed words, having the selected at least one of the cycled characters, within the input field with autocomplete.

3. The method of claim 2, wherein presenting the one or more proposed words comprises performing an autocomplete operation after each selection of the cycled characters.

4. The method of claim 1, wherein the input field with autocomplete is provided for display along a horizontal direction, and wherein presenting the cycling interface for cycling through the one or more of the characters comprises displaying the cycled characters as a series of moving characters along the horizontal direction.

5. The method of claim 1, wherein presenting the cycling interface for cycling through the characters comprises displaying the cycled characters as a series of moving characters along a circular direction spatially proximate to the input field with autocomplete.

6. The method of claim 1, further comprising entering an empty state when the input field with autocomplete is determined to contain no characters, wherein the empty state represents a state of the application when the input field with autocomplete contains no characters and a cycling operation is inactive.

7. The method of claim 6, wherein cycling through the characters comprises:
   transitioning from the empty state to a first cycling state, wherein the first cycling state represents the state of the application when the cycling operation is active for a first time;
   shifting the characters during the duration of the first input gesture;
   selecting a first character among the shifted characters; and
   performing a first autocomplete operation to present one or more proposed words based on the first character.

8. The method of claim 7, wherein selecting the first character comprises detecting removal of the first input gesture from a location within the input field with autocomplete.

9. The method of claim 7, wherein performing the first autocomplete operation comprises generating a first proposed word based on a search history.

10. The method of claim 9, further comprising:
    retrieving the search history from a memory;
    searching the search history for proposed words associated with the first character; and
    determining the first proposed word based on a search characteristic associated with the first character.

11. The method of claim 9, further comprising:
    determining if the first proposed word is to be selected; and
    transitioning from the first cycling state to a second cycling state when the first proposed word is determined not to be selected, wherein the second cycling state represents the state of the application when the cycling operation is active for a second time.

12. The method of claim 11, further comprising:
    receiving a second input gesture within the input field with autocomplete, the second input gesture being received subsequent of the first input gesture;
    shifting the characters during the duration of the second input gesture;
    selecting a second character among the shifted characters; and
    performing a second autocomplete operation to present one or more proposed words based on the first and second characters.

13. The method of claim 11, further comprising:
    providing for display, simultaneously with the cycling of the characters, a software keyboard independent of the cycling interface in response to the first input gesture; and
    receiving a keyboard input from the software keyboard.

14. The method of claim 13, further comprising:
    transitioning from the empty state to a keyboard state in response to the keyboard input when a cursor is located in the input field with autocomplete having no characters, wherein the keyboard state represents a state of the application when the software keyboard is active.

15. The method of claim 14, further comprising:
    transitioning from the first cycling state to the keyboard state in response to the keyboard input when the cursor is located directly after a first character in the input field with autocomplete.

16. The method of claim 14, further comprising:
    transitioning from the second cycling state to the keyboard state in response to the keyboard input when the cursor is located directly after a second character in the input field with autocomplete.

17. The method of claim 13, further comprising:
    completing a query term that contains the selected cycled character using a proposed word predicted from characters selected using the cycling interface and the software keyboard.

18. The method of claim 13, further comprising:
    determining that no proposed words predicted from selected cycled characters is selected; and determining that more than two cycled characters are selected through the cycling interface,
wherein the software keyboard is presented based on no proposed words being selected and more than two cycled characters being selected.

19. The method of claim 13, further comprising:
activating the software keyboard when at least two characters from the cycled characters are selected; and
disabling the cycling interface in response to the software keyboard being activated.

20. The method of claim 1, wherein the first input gesture is received via a touchscreen display, and wherein the first input gesture includes a long press touch gesture, a sliding motion gesture or a double tap touch gesture.

21. The method of claim 20, wherein the first input gesture includes the sliding motion gesture, wherein receiving the first input gesture comprises receiving the sliding motion gesture in a first direction to increase a shifting speed of the cycling, and wherein receiving the first input gesture comprises receiving the sliding motion gesture in a second direction opposite of the first direction to decrease the shifting speed of the cycling.

22. The method of claim 1, further comprising:
receiving, in response to the selecting of the character from the cycled characters, a second input gesture within the input field;
resuming, in response to the second input gesture, the cycling through the characters for a duration of the second input gesture;
selecting, in response to an end of the duration of the second input gesture, an additional character from the cycled characters; and
initiating an autocomplete operation to predict one or more proposed words using the selected character and the selected additional character for completing a query term in the input field.

23. The method of claim 1, further comprising:
if the input field contains characters:
providing for display a prompt, the prompt identifying an option to erase the input field;
receiving user input via the prompt, the user input indicating user selection of the option to erase the input field; and
erasing the input field based on the user selection.

24. The method of claim 1, wherein the overlay box is transparent such that one or more features of the input field are visible.

25. The method of claim 1, wherein the first input gesture comprises a long press gesture.

26. The method of claim 25, wherein the particular direction corresponds to a leftward direction for cycling through the characters for the duration of the long press gesture.

27. A system for entering text in an application, the system comprising:
a memory; and
one or more processors configured to execute instructions stored in the memory to perform operations comprising:
receiving an input gesture at a location in an input field with autocomplete of the application;
determining, in response to the received input gesture in the input field, that the input field with autocomplete of the application contains no characters;
presenting a cycling interface for cycling through characters available for entry into the input field with autocomplete, wherein presenting the cycling interface further comprises providing an overlay box superimposed over the input field, the input field comprising a search field of a web browser, and the one or more of the characters for cycling being provided for display within the overlay box;
cycling through the characters for a duration of the received input gesture in the input field, wherein, for the duration of the received input gesture, the cycling interface provides for display shifting of the characters in a particular direction;
selecting a character from the cycled characters at an end of the duration of the input gesture in the input field, the duration of the input gesture indicating which of the cycled characters to select for entry into the input field; and
providing the selected cycled character for display within the input field, the location of the input gesture in the input field indicating where to locate the selected cycled character for display.

28. A non-transitory machine readable medium embodying instructions that, when executed by a machine, allow the machine to perform a method of entering text in an application, the method comprising:
receiving an input gesture at a location in an input field with autocomplete of the application;
determining, in response to the received input gesture in the input field, that the input field with autocomplete of the application contains no characters;
presenting a cycling interface for cycling through characters available for entry into the input field with autocomplete, wherein presenting the cycling interface further comprises providing an overlay box superimposed over the input field, the input field comprising a search field of a web browser, and the one or more of the characters for cycling being provided for display within the overlay box;
cycling through one or more of the characters for a duration of the received input gesture in the input field, wherein, for the duration of the received input gesture, the cycling interface provides for display shifting of the characters in a particular direction;
selecting a character from the cycled characters at an end of the duration of the input gesture in the input field, the duration of the input gesture indicating which of the cycled characters to select for entry into the input field; and
providing the selected cycled character for display within the input field, the location of the input gesture in the input field indicating where to locate the selected cycled character for display.

* * * * *